O. G. DIEFENDORF.
BRICKMAKING MACHINE.
APPLICATION FILED JUNE 4, 1907.
930,053.
Patented Aug. 3, 1909.
3 SHEETS—SHEET 2.
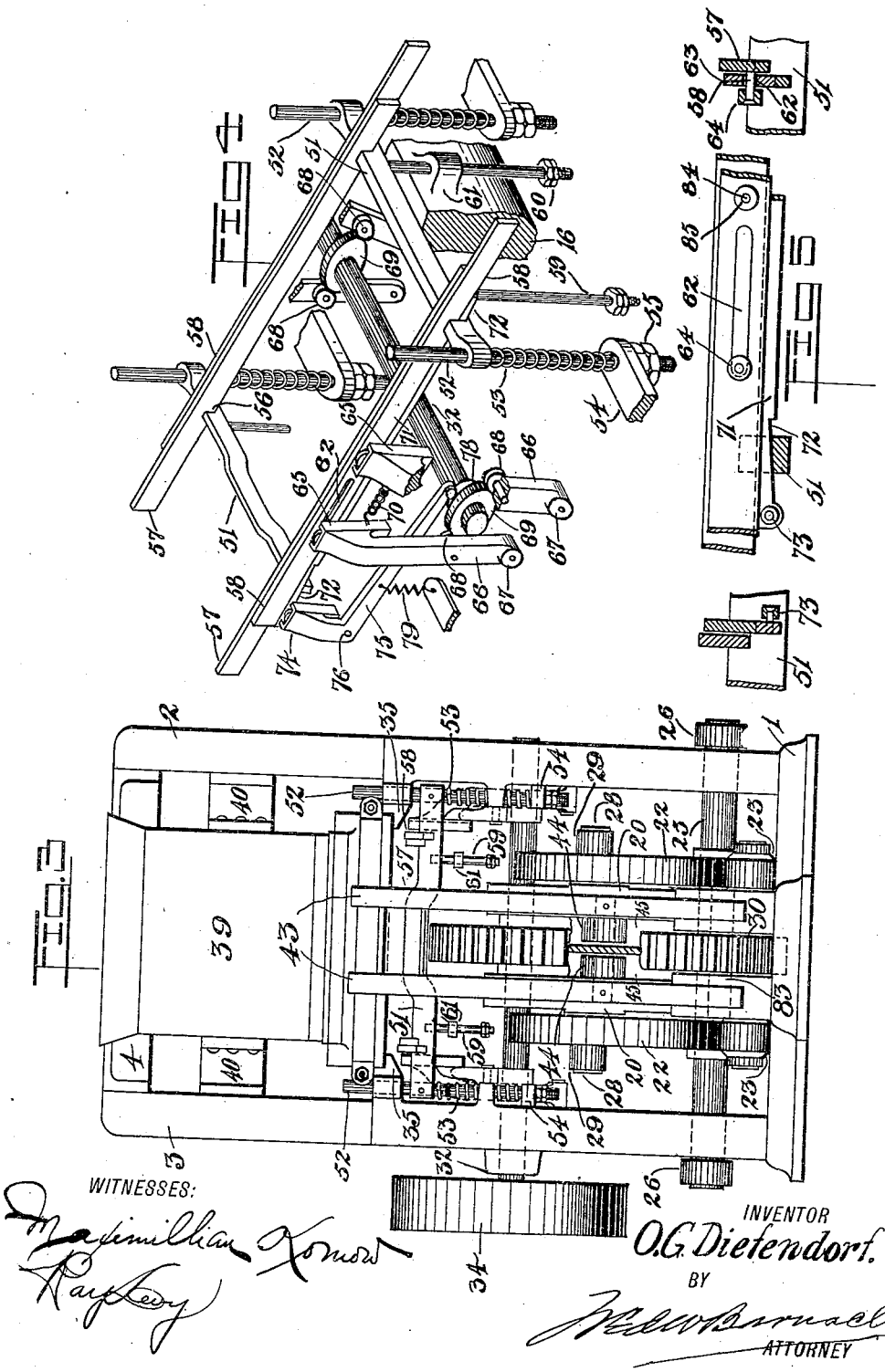
INVENTOR
O. G. Diefendorf.

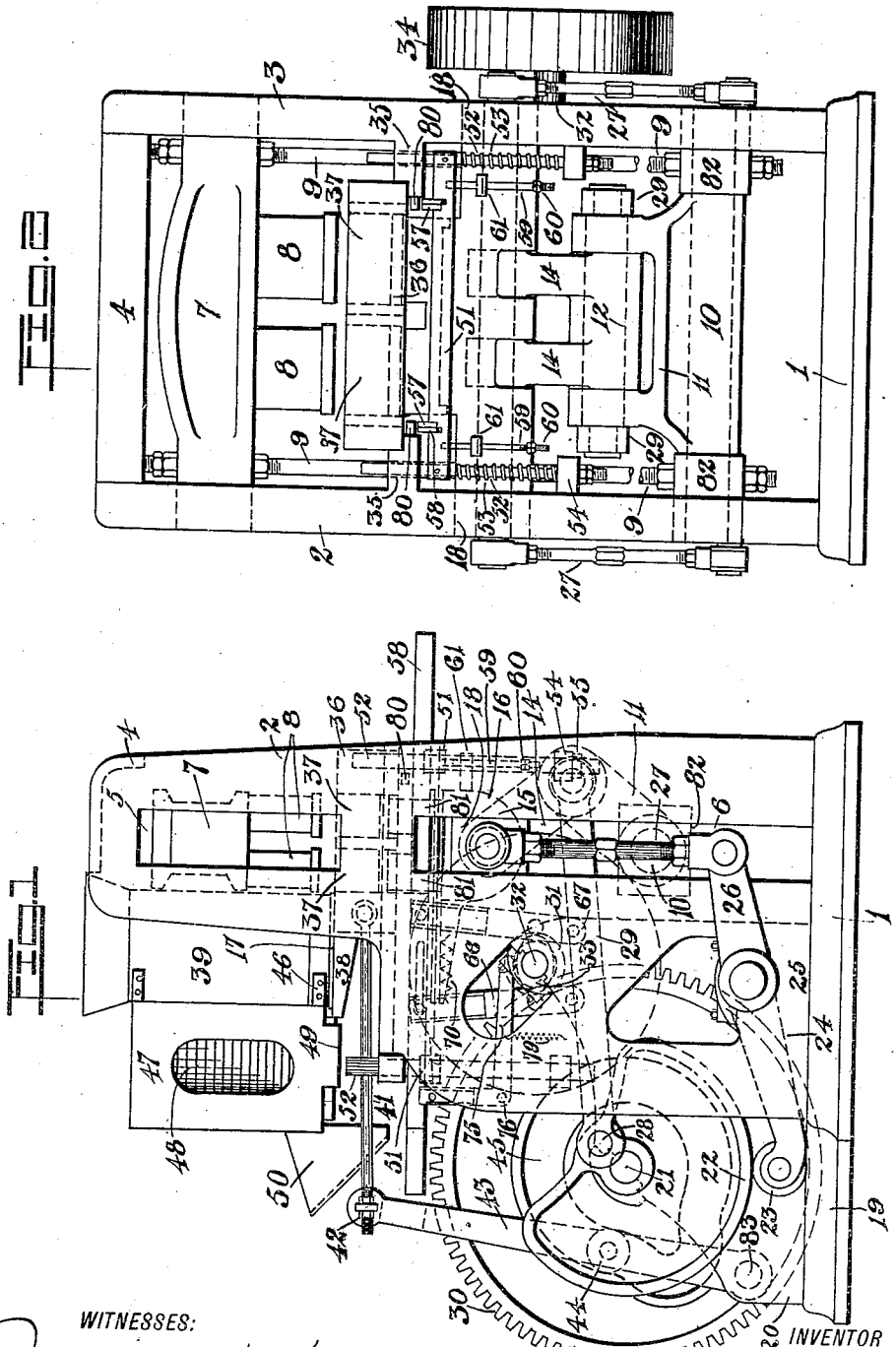

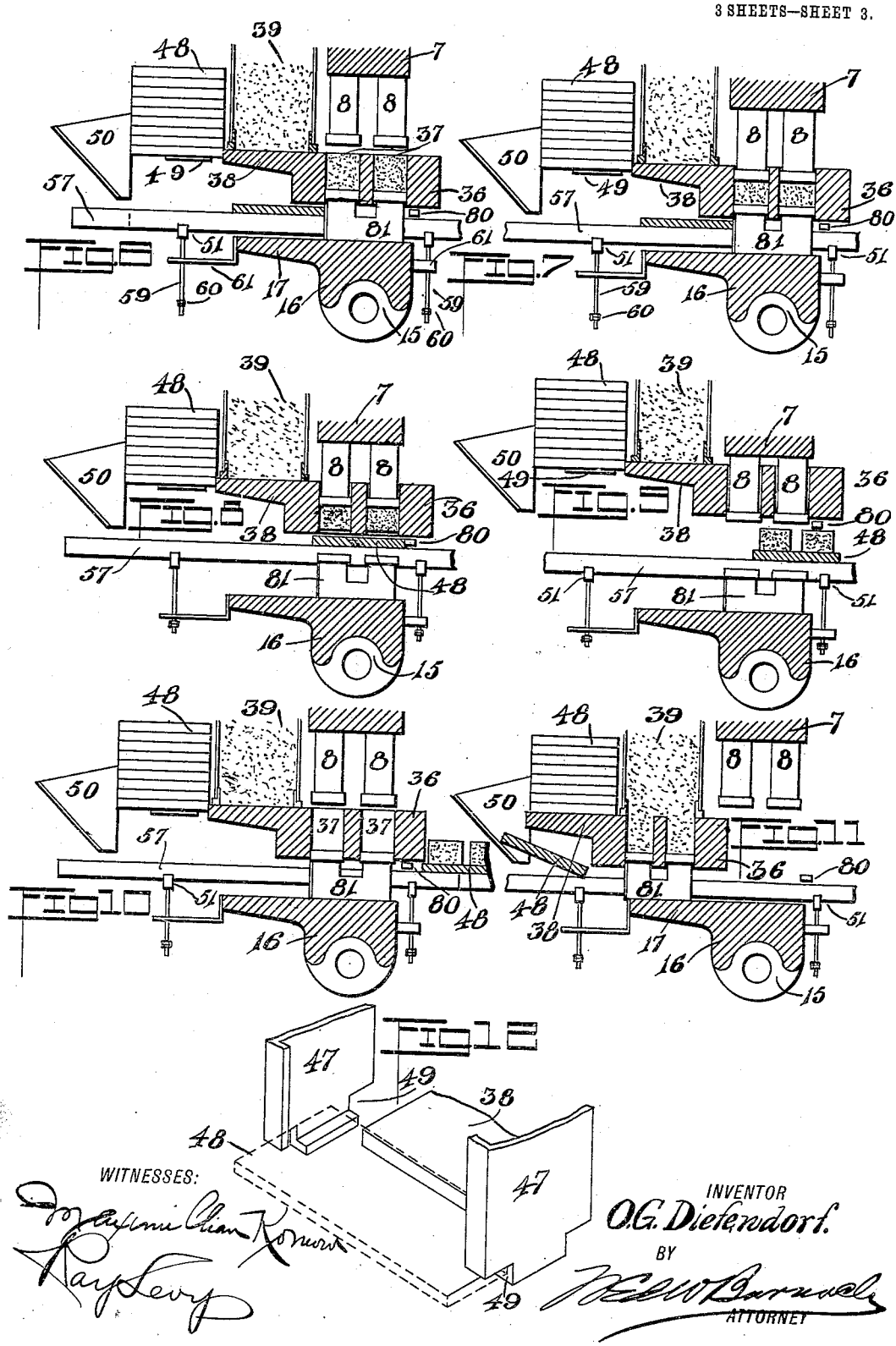

UNITED STATES PATENT OFFICE.

ORVIS GOLDEN DIEFENDORF, OF BINGHAMTON, NEW YORK, ASSIGNOR TO INTERNATIONAL BRICK MACHINE COMPANY, OF BINGHAMTON, NEW YORK, A CORPORATION OF NEW YORK.

BRICKMAKING-MACHINE.

No. 930,053.   Specification of Letters Patent.   Patented Aug. 3, 1909.

Application filed June 4, 1907. Serial No. 377,131.

*To all whom it may concern:*

Be it known that I, ORVIS GOLDEN DIEFENDORF, a citizen of the United States, residing in Binghamton, in the county of Broome and State of New York, have invented certain new and useful Improvements in Brickmaking-Machines, of which the following is a specification.

This invention relates to machines for forming plastic material, and the invention relates more particularly to a machine for forming bricks and similar blocks.

The object of this invention is the same as that set forth in my U. S. Letters Patent, No. 852,934, for brickmaking machines, dated May 7, 1908, namely, to provide a machine whereby the delivery of the bricks or blocks from the machine will be made from the bottom of the mold directly upon the pallet, or other conveying device, by which they are to be carried to the drying room or shed; from which pallet, or conveyer, they will not be removed until they are firmly set and hardened, thus insuring perfectly formed bricks, or blocks, with sharp, well defined edges and corners. In my Letters Patent aforesaid, I described a machine in which the mold is arranged to move vertically when delivering the molded bricks or blocks upon the pallets. The same object may also be attained in a machine wherein the mold remains stationary during the delivery operation; in which case, the pallet carrier must have a downward motion imparted to it while the pallet is receiving the bricks or blocks from the mold. Such a machine, in its specific details, is described and claimed by William T. Price, in his application for U. S. patent, Serial No. 369,645, filed April 22, 1907, for improvements in machines for forming plastic material. As illustrating one way of carrying out this modification of my invention, I give herewith a description of the machine as designed by said Price, reference being had to the accompanying drawings, in which:—

Figure 1 is a side elevation of the machine, Fig. 2 is a front elevation of the same, Fig. 3 is a rear elevation of the machine with the pallet magazine removed, Fig. 4 is a perspective view of a pallet shifting mechanism, Fig. 5 is a cross sectional view of a portion of the same, Fig. 6 is a detail sectional view of the machine, illustrating the mold filled with plastic material and closing the hopper containing the material, Fig. 7 is a similar view illustrating the upper plungers entering the mold to compress the material therein, Fig. 8 is a similar view illustrating the withdrawal of the lower plungers and the partial depression of the molded material by the upper plungers and the position of a pallet beneath the formed material, Fig. 9 is a similar view illustrating the manner in which the formed material is ejected from the mold and carried forward upon the pallets, Fig. 10 is a similar view illustrating the lower plungers and the upper plungers returning to their normal position, and the mold ready to be refilled, Fig. 11 is a similar view illustrating the mold in a shifted position beneath the material hopper, and ejecting a pallet from the pallet magazine, Fig. 12 is a perspective view of a portion of the pallet magazine.

This machine is constructed upon a T-shaped base 1, the base carrying side frames 2 and 3 connected at their upper ends as at 4. The side frames are slotted to provide guide ways 5 and 6, the guide ways 5 guiding the ends of the cross head 7 movably mounted between the frames 2 and 3, said cross head being provided with depending plungers 8 constituting the upper plungers of the machine. The cross head 7 is supported by rods 9 carried by lower blocks 82 and cross shaft 10, said blocks being guided in the guide ways 6. Connected to the cross shaft 10 is a bifurcated toggle link 11, to which is pivotally connected, by a pin 12, the link 14, said link being pivotally held in the sockets 15 of a table 16, said table having a rear extension 17 and outwardly extending guide blocks 18, said guide blocks engaging in the guide ways 6 of the frames 2 and 3.

The mechanism employed for vertically reciprocating the table 16, consists of providing the leg 19 of the base 1 with two bearings 20, in which bearings is journaled a shaft 21. Upon the outer ends of the shaft 21 are mounted cam wheels 22 and engaging the under side of said cam wheels are rollers 23 revolubly mounted upon the ends of crank arms 24, carried by a shaft 25 journaled transversely within the side frames 2 and 3. The ends of the shaft 25 protrude beyond the side frames and are provided with crank arms 26, said arms being connected by pitmen 27 to the guide blocks 18 of the table 16. It will thus be seen that when the shaft 21 is rotated, the table 16, toggles 11 and 14, rods 9, cross head 7 and plungers 8 will be slightly raised and lowered through the medium of the cams 22, shaft 25 and pitmen 27.

To move the cross head 7 and the plungers 8 independently of, or simultaneously with or relatively to the table 16, the cams 22 are provided with wrist pins 28, said pins being connected by bars 29 to the pin 12 of the toggle links 11 and 14. The movement of the cross head 7 depends upon the motion of guide blocks 18 and also upon the movement of the toggle links 11 and 14. Motions for cross head 7 different from guide blocks 18 are therefore obtained.

To drive the shaft 21, there is mounted upon the same a large spur wheel 30, said spur wheel meshing with a small spur wheel 31 mounted upon a drive shaft 32 journaled in bearings 33, carried by the side frames 2 and 3 and the center bearings 20. The outer end of the shaft 32 is provided with a pulley wheel 34, whereby the machine can be driven from a suitable source of energy.

The frames 2 and 3 are provided with inwardly extending brackets 35 upon which is slidably mounted a mold 36, said mold having a plurality of openings 37 formed therein which conform in shape to the article to be produced from plastic material by my improved machine. The mold is normally located beneath the plungers 8, and is provided with a rear extension 38 normally closing the lower end of a hopper 39 adapted to contain the material to be molded. The hopper 39 is supported by brackets 40 between the frames 2 and 3. The mold is horizontally reciprocated by rods 41 adjustably connected, as at 42, to levers 43, said levers being pivotally mounted, as at 83 in the bearings 20. The levers 43 are provided with rollers 44, said rollers engaging a cam 45, forming part of gear 30, located upon the shaft 21.

Suitably secured, as at 46, to the hopper 39 is a pallet magazine 47 containing pallets 48. The lower end of the magazine is cut away and provided with brackets 49 adapted to support the pallets within the magazine. Carried by the magazine is an inclined chute 50, for deflecting the pallets 48 when moved from the magazine by the rearward extension 38 of the mold 36.

To support the pallets 48 as they descend from the inclined chute and to carry said pallets forward beneath the mold 36 and lower the same at predetermined times, a novel mechanism illustrated in Figs. 4 and 5 of the drawings is employed. The mechanism consists of two cross bars 51, having depending rods 52, supported by coiled springs 53 upon brackets 54, carried by the side frames 2 and 3. The lower ends of the rods 52 are provided with nuts 55 to limit their upward movement. The bars 51 are provided with grooves 56 for longitudinally disposed rails 57 and 58, the rails 57 being located upon the inner sides of the rails 58. The cross bars 51 are provided with depending pins 59 carrying nuts 60 upon their lower ends. The pins 59 pass through brackets 61 carried by the table 16. It is the function of said pins, nuts and brackets to draw downward the cross bars 51 and rails 57 and 58, together with the pallet and formed material when said material has been forced from the mold, thus relieving the pressure of said material against the top plunger, permitting the pallet to move forward. The rails 58 are slotted, as at 62, and extending through said slots are pins 63 carried by the rails 57. Upon the ends of the pins 63 are journaled rollers 64. Fastened to the rails 58 by pins 84 are the revoluble rollers 85, said rollers 64 and 85 engaging in the channel-shaped ends 65 of arms 66, said arms being pivotally connected as at 67, to the side frames 2 and 3 of the machine. Journaled upon the inner sides of the arms 66 near their lower ends are rollers 68 adapted to engage elliptical-shaped cams 69 mounted upon the shaft 32. The arms 68 are connected by coiled springs 70. The rails 57 rest on the bars 51 in the slots 56. The rails 58 rest on the strips 71 which in turn rest on the bars 51 in the slots 56. Strips 71 are provided with inclined surfaces 72. The rear ends of the strips 71 are provided with revoluble rollers 73 adapted to engage in the channel shaped ends 74 of a lever 75, said levers being arranged upon the inner sides of the frames 2 and 3 and connected thereto as at 76. The ends of the levers are provided with revoluble rollers 77, said rollers engaging cams 78 mounted upon the shaft 32. The levers 75 are held in engagement with the same by coiled springs 79 attached to the side frames 2 and 3. The function of the strips 71 with their inclined surfaces is to raise and lower rails 58 with respect to the rails 57, when said rails 58 are moving forward or rearward respectively. To temporarily hold the pallets 48 while formed material is being placed upon the same, the inwardly extending brackets 35 with lugs 80 are provided, the pallets being lowered to clear these lugs when the formed material is being removed from the machine.

Slidably mounted upon the table 16 and movable horizontally with the mold 36 are plungers 81, these plungers constituting the lower plungers of the machine and conforming in shape to the plungers 8 and the openings 37 of the mold 36.

The operation of the machine can be readily understood by referring to Figs. 6 to 11 inclusive in connection with Figs. 1 and 4. The mold 36 is moved beneath the hopper 39 to receive material, this being accomplished through the medium of the rods 41, levers 43 and cams 45. The mold 36 when beneath the hopper has the lower ends of the openings 37 closed by the lower plungers 81 resting upon the table 16. When the mold has been moved to this position, a pallet 48 is removed from the magazine 47 and allowed to descend upon the rails 57 and 58, where the pallet is supported and is moved forward by the successive strokes of the rails. On the forward strokes of the rails 57, slats 58 are dropped slightly below, through the operation of the inclined surfaces 72 of the strip 71. When the openings 37 of the mold have been filled the mold is moved forward to the position illustrated in Fig. 6 of the drawings, the rearward extension 38 closing the hopper 39, and the brackets 49 supporting the pallets 48 within the magazine 47. The upper plungers 8 are now actuated to compress the material within the mold 36, and immediately upon compression, the table 16 is lowered sufficiently to allow a pallet to pass under the mold 36 and engage the lugs 80, said pallet being supported by the rails 57 and 58. The table 16, the rails 57 and 58 and the upper plungers 8 are now actuated in unison, the plungers 8 force the compressed or formed material from the mold 36 upon the pallet and the rails 57 and 58 are forced downwardly by the descending molded material. Friction of the brick on the upper plunger, due to the pressure from springs 53, prevents the pallet from moving forward as soon as the pallet clears lugs 80, but as soon as the material is free from the mold, lugs 61 engage with nuts 60, which are suitably adjusted and pull the bars 51, rails 57 and 58 and the pallet with the formed material free from the top plungers. The pallet is then moved forward by rails 57 and 58, which are in constant reciprocation. Immediately following this operation, the table 16, rails 57 and 58 and plungers are returned to their normal position illustrated in Fig. 10 of the drawings and the mold is again ready to be moved backward to receive a fresh supply of material from the hopper 39. The novel mechanism including the toggle links 11 and 14 and the cam actuated pitmen 27 permit of the upper and lower plungers being moved in the manner just described, and through the medium of the cams 69 and 78, together with the inclined surfaces 72, the rails 57 and 58 can be rhythmically actuated to carry the pallets forward.

Having thus described, by way of illustration, a machine embodying my invention; and without confining myself to any particular details of construction, such as the horizontally movable mold, or the automatic pallet moving mechanism, what I claim as my invention and desire to secure by Letters Patent is—

The combination of a frame, an upper plunger movably mounted in the frame, a lower plunger movably mounted in the frame, a mold adapted to be held stationary between the plungers, means for compressing material in the mold by a downward motion of the upper plunger, means for retracting the lower plunger, means for delivering the molded material from the mold by a further downward motion of the upper plunger, means whereby a pallet, or other conveying device, may be inserted below the mold after the lower plunger has been withdrawn from the mold, and means for lowering the pallet or other conveyer with the molded material resting thereon while delivery from the mold is taking place.

In witness whereof, I have this 22d day of May, 1907 set my hand.

ORVIS GOLDEN DIEFENDORF.

Witnesses:
F. J. BAYLESS,
NED W. BARNACLO.